United States Patent Office 3,089,910
Patented May 14, 1963

3,089,910
PREPARATION OF VINYLIDENE FLUORIDE
Franciszek Olstowski, Jones Creek, and John D. Watson, Lake Jackson, Tex., assignors to The Dow Chemical Company, Midland, Mich., a corporation of Delaware
No Drawing. Filed Oct. 5, 1959, Ser. No. 844,196
3 Claims. (Cl. 260—653.3)

This invention relates to a method for preparing vinylidene fluoride and more particularly involves the interaction of a fluorohalomethane with a saturated aliphatic hydrocarbon, whereby a fluorocarbon radical unites with a hydrocarbon radical to produce vinylidene fluoride.

Conventional methods of preparing vinylidene fluoride involve the use of expensive reactants. One such method involves refluxing $CF_3CH_2I$ in ethyl ether in the presence of magnesium, Henne, Journal American Chemical Society, volume 60, page 2275. Another method involves the pyrolyzing of $CF_3CH_3$, Downing et al., U.S. Patent 2,480,560. Both procedures are uneconomical and have not been used extensively in commercial installations.

It is an object of the present invention to provide a new and improved method of preparing vinylidene fluoride. Another object is to provide such a method for producing vinylidene fluoride from relatively inexpensive and readily available starting materials. Still a further object of the present invention is to provide a process for preparing vinylidene fluoride from fluorinated halomethanes and saturated aliphatic hydrocarbons. Other objects will appear hereinafter.

These and other objects are readily accomplished by contacting, at a temperature of from about 600° C. to about 1000° C., a fluorohalomethane together with a saturated aliphatic hydrocarbon containing from one to two carbon atoms and separating the vinylidene fluoride from the reaction mixture.

The fluorocarbon radical will be supplied in accordance with our invention by a fluorohalocarbon having the formula $CF_3X$, wherein X represents a halogen selected from the group consisting of Cl and Br. The hydrocarbon radical will be supplied by methane. While variations in the reactant ratio of the order of 4:1 to 1:4 showed no substantial effects in the conversions and yields of the reaction, the use of substantially equimoleculer proportion of the hydrocarbon to the fluorocarbon are preferred.

The reactor will be heated to temperatures of from about 600° C. to about 1000° C. At temperatures materially below 600° C., the conversion is too low to be practicable. Optimum conversions and yields are generally obtained at temperatures of from about 600° C. to about 800° C., particularly at contact times of about 0.5 second.

Contact times, as expressed herein, are based on the time the reactant gases spend in that portion of the reactor that is within 100° C. of the temperature indicated for the operation. In the process, the contact times will be within the range of from about 0.1 second to about 5 seconds. Preferably, a contact time of 0.5 second is employed.

Generally, the process will be carried out at atmospheric pressures, that is, a pressure of approximately one atmosphere. However, higher or lower variations in the range of 0.2 to 5 atmospheres have little or no effect on the conversions and yields.

The products of the reaction passing from the reactor will usually be scrubbed in caustic solution in order to remove acidic products from the gaseous stream, and the vinylidene fluoride recovered thereafter in a conventional manner.

The following examples are given to illustrate our invention but are not to be construed as limiting the invention thereto:

*Example 1*

The reactor consisted of a copper tube approximately 24 inches in length and having an inside diameter of 0.43 inch. The tube was heated by a 2 kilowatt Sentry tube furnace.

A premixed gaseous equimolecular mixture of $CF_3Cl$ and $CH_4$ was passed into the reactor at a rate of approximately 0.5 cubic foot per hour. The temperature of the reaction zone was 950° C., and the contact time in the reaction zone was approximately 0.5 second.

The sample of the product gases from the reactor was analyzed by vapor phase chromatography and verified by infrared to contain 7.3 volume percent of $CF_3Cl$, 43.3 volume percent $CH_4$, 15.1 volume percent $CF_3H$, and 11.8 volume percent $CF_2=CH_2$. Calculation on a one hundred percent fluorocarbon basis showed the product to contain 21.3 volume percent $CF_3Cl$, 44.1 volume percent $CF_3H$, and 34.5 volume percent $CF_2=CH_2$.

*Example 2*

The procedure as outlined in Example 1 was repeated except that the contact time was approximately 0.25 second.

On analysis the product gases were found to contain 9.6 volume percent $CF_3Cl$, 38.0 volume percent $CH_4$, 6.1 volume percent $CF_3H$, and 5.6 volume percent $CF_2=CH_2$.

*Example 3*

The reactor consisted of a nickel tube approximately 12 inches in length and having an inside diameter of ⅜ of an inch. Methane was passed into the reactor at approximately 0.09 cubic feet per hour together with $CF_3Br$ at approximately 0.10 cubic feet per hour. The reaction zone was maintained at a temperature of 700° C.

On analysis the product gases were found to contain significant quantities of vinylidene fluoride.

Various modifications may be made in the present invention without departing from the spirit and scope thereof and it is to be understood that we limit ourselves only as defined in the appended claims.

We claim:
1. A process for preparing vinylidene fluoride which comprises contacting, at a temperature from about 600° C. to about 1000° C. methane with a compound selected from the group consisting of chlorotrifluoromethane and bromotrifluoromethane and separating vinylidene fluoride from the reaction mixture.
2. A process for preparing vinylidene fluoride which comprises contacting, at a temperature of from about 600° C. to about 1000° C., methane with chlorotrifluoromethane, and separating vinylidene fluoride from the reaction mixture.
3. A process for preparing vinylidene fluoride which comprises contacting, at a temperature of from about 600° C. to about 1000° C., methane with bromotrifluoromethane and separating vinylidene fluoride from the reaction mixture.

References Cited in the file of this patent
UNITED STATES PATENTS

| | | |
|---|---|---|
| 2,551,573 | Downing et al. | May 8, 1951 |
| 2,551,639 | Feasley et al. | May 8, 1951 |
| 2,627,529 | Feasley et al. | Feb. 3, 1953 |
| 2,687,440 | McGrew et al. | Aug. 24, 1954 |
| 2,758,138 | Nelson | Aug. 7, 1956 |
| 2,979,539 | Errede et al. | Apr. 11, 1961 |

FOREIGN PATENTS

| | | |
|---|---|---|
| 732,269 | Great Britain | June 22, 1955 |